United States Patent
Yamada et al.

(10) Patent No.: US 11,333,205 B2
(45) Date of Patent: May 17, 2022

(54) POWER TRANSMISSION DEVICE

(71) Applicant: DENSO CORPORATION, Kariya (JP)

(72) Inventors: Yugo Yamada, Kariya (JP); Akira Kishibuchi, Kariya (JP); Yohei Kushida, Kariya (JP); Junichi Nakagawa, Kariya (JP); Satoshi Kawakami, Kariya (JP); Toshinobu Takasaki, Kariya (JP); Kozo Tomokawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 573 days.

(21) Appl. No.: 16/409,955

(22) Filed: May 13, 2019

(65) Prior Publication Data

US 2019/0264758 A1  Aug. 29, 2019

Related U.S. Application Data

(63) Continuation of application No. PCT/JP2017/040492, filed on Nov. 9, 2017.

(30) Foreign Application Priority Data

Dec. 16, 2016 (JP) .............................. JP2016-244647

(51) Int. Cl.
*F16D 27/112* (2006.01)
*H02K 1/22* (2006.01)

(52) U.S. Cl.
CPC ............. *F16D 27/112* (2013.01); *H02K 1/22* (2013.01)

(58) Field of Classification Search
None
See application file for complete search history.

(56) References Cited

U.S. PATENT DOCUMENTS

| 3,624,767 | A | * | 11/1971 | Kroeger | ................ | F16D 27/112 |
| | | | | | | 192/18 B |
| 4,635,774 | A | * | 1/1987 | Sekiguchi | ............. | F16D 27/112 |
| | | | | | | 192/52.2 |
| 5,195,625 | A | * | 3/1993 | Chang | ................... | F16D 27/112 |
| | | | | | | 192/200 |
| 5,273,409 | A | * | 12/1993 | Swain | ................... | F04C 29/005 |
| | | | | | | 192/103 F |

(Continued)

FOREIGN PATENT DOCUMENTS

| JP | S57-019233 U | 2/1982 |
| JP | 2002-098170 A | 4/2002 |

(Continued)

*Primary Examiner* — Colby M Hansen
(74) *Attorney, Agent, or Firm* — Posz Law Group, PLC

(57) ABSTRACT

A power transmission device includes an armature that is shaped into a circular ring form. The armature is configured to be coupled with a rotor by an electromagnetic attractive force of an electromagnet at a time of energizing the electromagnet and is configured to be decoupled from the rotor at a time of deenergizing the electromagnet. The armature has an armature-side friction surface that is configured to contact a rotor-side friction surface of the rotor at the time of energizing the electromagnet. The armature-side friction surface has a plurality of grooves, each of which extends from a radially inner end portion of the armature-side friction surface to a location that is on a radially inner side of a radially outer end portion of the armature-side friction surface.

5 Claims, 13 Drawing Sheets

(56) References Cited

U.S. PATENT DOCUMENTS

2019/0264759 A1    8/2019   Yamada et al.

FOREIGN PATENT DOCUMENTS

| JP | 2003-240018 A | 8/2003 |
| JP | 2003-314584 A | 11/2003 |
| JP | 2004-124815 A | 4/2004 |
| WO | 2018/110168 A1 | 6/2018 |

\* cited by examiner

POWER TRANSMISSION DEVICE

CROSS REFERENCE TO RELATED APPLICATIONS

This application is a continuation application of International Patent Application No. PCT/JP2017/040492 filed on Nov. 9, 2017, which designated the U.S. and claims the benefit of priority from Japanese Patent Application No. 2016-244647 filed on Dec. 16, 2016. The entire disclosures of all of the above applications are incorporated herein by reference.

TECHNICAL FIELD

The present disclosure relates to a power transmission device.

BACKGROUND

Previously, there is known a power transmission device that includes: a rotor that is rotated by a rotational drive force outputted from a drive source; an armature that is opposed to the rotor and is made of a magnetic material, which is the same as a magnetic material of the rotor; and an electromagnet that attracts and couples a friction surface of the armature to a friction surface of the rotor upon energization of the electromagnet.

SUMMARY

According to one aspect of the present disclosure, there is provided a power transmission device for transmitting a rotational drive force outputted from a drive source to a drive subject device. The power transmission device includes: an electromagnet that is configured to generate an electromagnetic attractive force at a time of energizing the electromagnet; and a rotor that is configured to be rotated by the rotational drive force. The power transmission device includes an armature that is shaped into a circular ring form and is configured to be coupled with the rotor by the electromagnetic attractive force of the electromagnet at the time of energizing the electromagnet and is configured to be decoupled from the rotor at a time of deenergizing the electromagnet.

The rotor has a rotor-side friction surface that is configured to contact the armature at the time of energizing the electromagnet. The armature has an armature-side friction surface that is configured to contact the rotor-side friction surface at the time of energizing the electromagnet. At least one of the rotor-side friction surface and the armature-side friction surface has a plurality of grooves.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
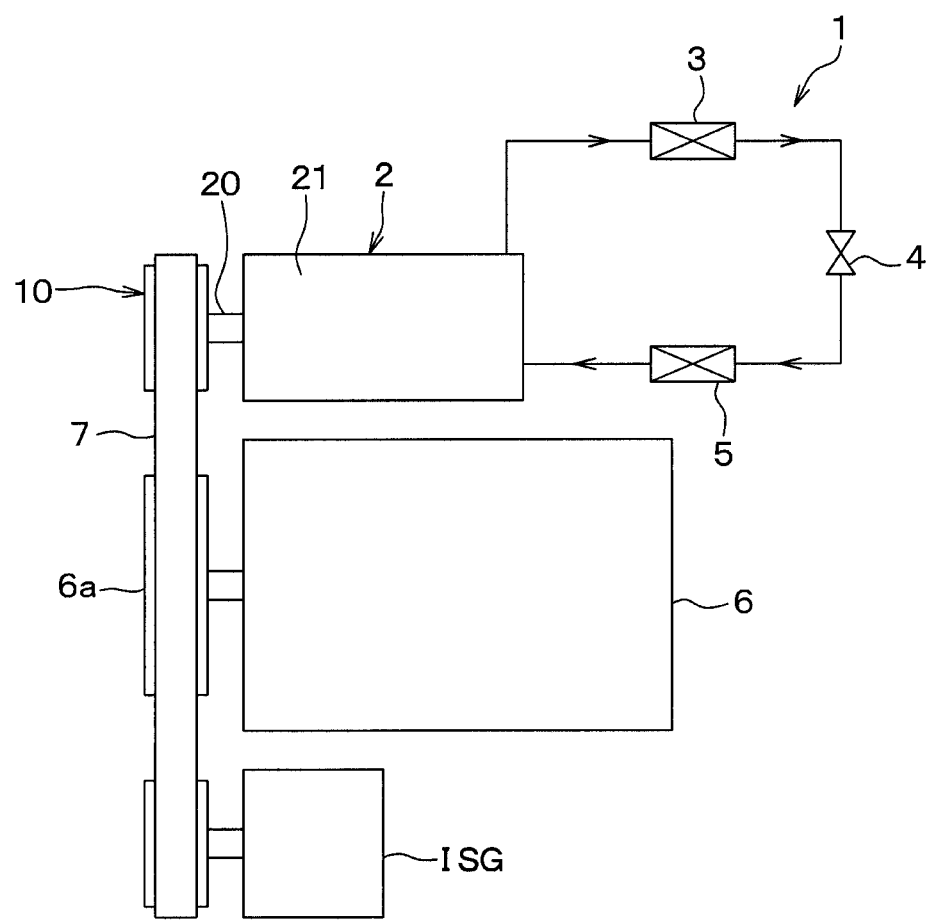
FIG. 1 is a diagram showing an overall structure of a refrigeration cycle, in which a power transmission device of a first embodiment is applied.

Previously, there is known a power transmission device that includes: a rotor that is rotated by a rotational drive force outputted from a drive source; an armature that is opposed to the rotor and is made of a magnetic material, which is the same as a magnetic material of the rotor; and an electromagnet that attracts and couples a friction surface of the armature to a friction surface of the rotor upon energization of the electromagnet.

In this type of power transmission device, when slipping occurs between the friction surface of the rotor and the friction surface of the armature, a friction material (i.e., a facing material), which is embedded in a portion of the friction surface of the rotor, may possibly be fastened by the heat generated by the slipping. The fastening of the friction material is not desirable since the fastening of the friction material causes an increase in a time period of the slipping between the rotor and the armature, and/or deterioration of a friction coefficient of the friction material.

With respect to this point, according to one previously proposed technique, there is proposed a structure that cuts a fastened component of the friction material. According to this technique, the fastened component of the friction material is cut by grooves that are formed at the friction surface of the armature.

However, according to the previously proposed technique, the grooves, which are formed at the friction surface of the armature, extend from a radially inner end portion of the friction surface to a radially outer end portion of the friction surface, so that a contact surface area between the friction surface of the rotor and the friction surface of the armature is disadvantageously reduced. This is not preferable because it causes easy occurrence of slippage between the friction surface of the rotor and the friction surface of the armature.

Furthermore, although the previously proposed technique teaches the liming of the fastening of the friction material embedded in the friction surface of the rotor, the previously proposed technique does not disclose or suggest a study about the adhesion between the friction surface of the rotor and the friction surface of the armature.

When a melt, which is generated by the adhesion between the friction surface of the rotor and the friction surface of the armature, grows largely, there is a disadvantage, such as easy adhesion of the armature to the rotor, which inconveniently disables decoupling of the armature from the rotor. The adhesion phenomenon is a phenomenon (a phenomenon of similar composition metal welding) of melting a part of a contact portion between the friction surface of the rotor and the friction surface of the armature both made of the same type magnetic material. The adhesion phenomenon is different from a sticking phenomenon of the friction material embedded in the friction surface of the rotor.

According to a study of the inventors of the present application, it is found that the adhesion between the friction surface of the rotor and the friction surface of the armature tends to occur particularly when the power transmission device is applied to a drive source that is provided with an integrated starter generator (ISG) to assist an output of the drive source.

In view of the above tendency, the inventors of the present application have diligently studied the cause of the large growth of the melt generated by the adhesion between the friction surface of the rotor and the friction surface of the armature. As a result of the study, one cause is identified as follows. That is, when an excessive compressive load is applied to the rotor, a radially inner side of the rotor is deformed to bulge toward the armature to cause a local increase in a surface pressure of each friction surface. Thereby, the generation of the melt caused by the adhesion is localized at the radially inner side of the rotor. The adhesion between the friction surface of the rotor and the friction surface of the armature is not necessarily limited to the case where the power transmission device is applied to the drive source provided with the integrated starter generator. The adhesion between the friction surface of the rotor and the friction surface of the armature may also occur when the power transmission device is applied to a drive source that applies a large load to the rotor.

A power transmission device of the present disclosure is designed as a power transmission device that transmits a rotational drive force outputted from a drive source to a drive subject device.

According to one aspect of the present disclosure, the power transmission device includes: an electromagnet that is configured to generate an electromagnetic attractive force at a time of energizing the electromagnet; and a rotor that is configured to be rotated by the rotational drive force. The power transmission device includes an armature that is shaped into a circular ring form and is configured to be coupled with the rotor by the electromagnetic attractive force of the electromagnet at the time of energizing the electromagnet and is configured to be decoupled from the rotor at a time of deenergizing the electromagnet.

The rotor has a rotor-side friction surface that is configured to contact the armature at the time of energizing the electromagnet. The armature has an armature-side friction surface that is configured to contact the rotor-side friction surface at the time of energizing the electromagnet. At least one of the rotor-side friction surface and the armature-side friction surface has a plurality of grooves, each of which extends from a radially inner end portion of the at least one of the rotor-side friction surface and the armature-side friction surface to a location that is on a radially inner side of a radially outer end portion of the at least one of the rotor-side friction surface and the armature-side friction surface.

Accordingly, even when the adhesion occurs between the rotor-side friction surface and the armature-side friction surface, the melt, which is generated by the adhesion, enters the grooves. Thus, the melt, which is generated by the adhesion between the rotor-side friction surface and the armature-side friction surface, can be limited from growing large at the contact portion between the rotor-side friction surface and the armature-side friction surface.

In addition, the grooves are formed at the region, at which the adhesion is likely to occur, i.e., at the region, which extends from the radially inner end portion of the friction surface to the location on the radially inner side of the radially outer end portion of the friction surface. With this configuration, it is possible to ensure a required contact surface area between the rotor-side friction surface and the armature-side friction surface in comparison to the configuration where the grooves extend along the entire radial extent from the radially inner end portion to the radially outer end portion at the friction surface.

Therefore, the power transmission device of the present disclosure can ensure the required contact surface area between the friction surface of the rotor and the friction surface of the armature and can limit various disadvantages caused by adhesion between the friction surface of the rotor and the friction surface of the armature.

Hereinafter, embodiments of the present disclosure will be described with reference to the accompanying drawings. In the following embodiments, parts that are the same as or equivalent to the parts described in the preceding embodiment(s) may be given the same reference signs, and descriptions thereof may be omitted. In addition, when only some of the components are described in the embodiment, the components described in the preceding embodiment(s) can be applied to the other components. The following embodiments may be partially combined with each other even if they are not particularly specified as long as there is no problem in particular in the combination.

First Embodiment

The present embodiment will be described with reference to FIGS. 1 to 11. In the present embodiment, there will be described an example where a power transmission device 10 is applied to a compressor 2 of a vapor compression refrigeration cycle 1 shown in FIG. 1.

In a vehicle air conditioning apparatus for conditioning the air in a vehicle cabin, the refrigeration cycle 1 functions as an apparatus for adjusting the temperature of the air blown into the vehicle cabin. The refrigeration cycle 1 includes: the compressor 2 that compresses and discharges refrigerant; a radiator 3 that radiates heat from the refrigerant discharged from the compressor 2; an expansion valve 4 that depressurizes the refrigerant outputted from the radiator 3; and an evaporator 5 that evaporates the refrigerant depressurized through the expansion valve 4. The compressor 2, the radiator 3, the expansion valve 4 and the evaporator 5 are connected one after the other like a loop to form a closed circuit.

A rotational drive force, which is outputted from an engine 6, is transmitted to the compressor 2 through a V-belt 7 and the power transmission device 10. In the present embodiment, the engine 6 serves as a drive source, which outputs the rotational drive force, and the compressor 2 serves as a drive subject device.

The engine 6 of the present embodiment is provided with an integrated starter generator ISG that is configured to assist the output of the engine 6 to reduce the fuel consumption. The integrated starter generator ISG is a device that has both of a function of a starter for starting the engine 6 and a function of an electric generator. The integrated starter generator ISG is connected to a rotation output portion 6a of the engine 6 through the V-belt 7.

For instance, a swash plate type variable displacement compressor may be used as the compressor 2. Another type of variable displacement compressor or a fixed displacement compressor (e.g., a scroll type fixed displacement compressor or a vane type fixed displacement compressor) may be used as the compressor 2 as long as such a compressor can compress and discharge the refrigerant of the refrigeration cycle 1.

Figure 2:
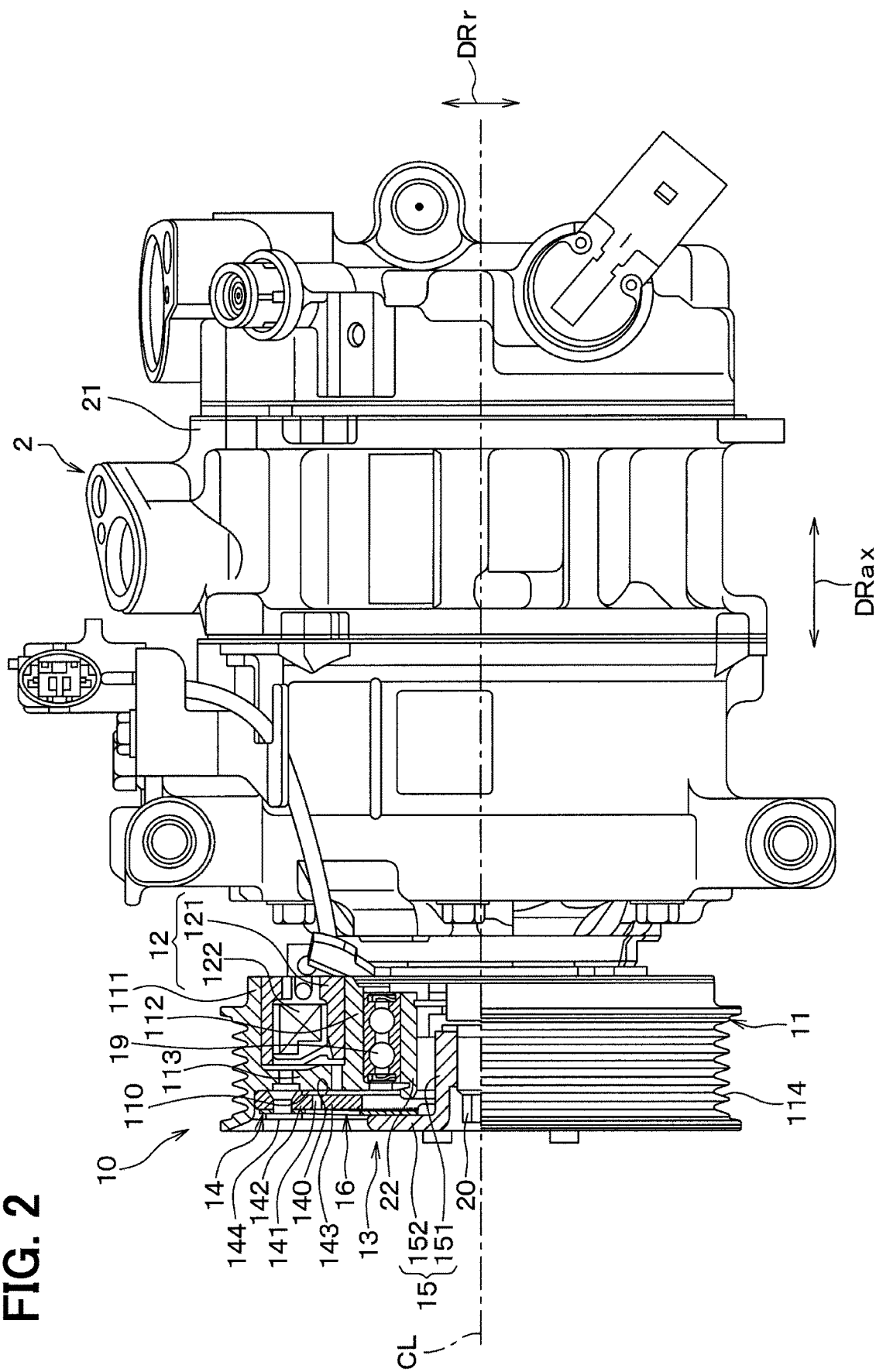
FIG. 2 is a schematic diagram showing the power transmission device and a compressor according to the first embodiment.

Here, FIG. 2 is a schematic diagram that schematically shows the power transmission device 10 and the compressor 2 of the first embodiment. In FIG. 2, a half-cross section of the power transmission device 10 is indicated to depict an internal structure of the power transmission device 10. In FIG. 2, a reference sign DRax indicates an axial direction of the shaft 20 that extends along a central axis CL of the shaft 20 of the compressor 2. Furthermore, a reference sign DRr shown in FIG. 2 indicates a radial direction of the shaft 20 that is perpendicular to the axial direction Drax. The above discussion is also applicable to the other drawings that are other than FIG. 2.

In the compressor 2 of FIG. 2, one end portion of the shaft 20 is exposed to an outside of a housing 21 that forms an outer shell of the compressor 2. The power transmission device 10 is installed to an exposed portion of the shaft 20, which is exposed to the outside of the housing 21. An undepicted seal member (e.g., a lip seal) is installed to the shaft 20 to limit leakage of the refrigerant from an inside of the housing 21 to the outside through a gap between the shaft 20 and the housing 21. A material, a shape and the like of the seal member are optimized to implement high sealing performance between the shaft 20 and the housing 21.

The power transmission device 10 is a device that enables and disables transmission of the rotational drive force of the engine 6, which serves as a drive source for driving the vehicle, to the compressor 2, which is the drive subject device. As shown in FIG. 1, the power transmission device 10 is connected to the rotation output portion 6a of the engine 6 through the V-belt 7.

As shown in FIG. 2, the power transmission device 10 includes: a rotor 11; a driven-side rotatable body 13 that is rotatable integrally with the shaft 20 when the driven-side rotatable body 13 is coupled to the rotor 11; and an electromagnet 12 that is configured to generate an electromagnetic attractive force for coupling between the driven-side rotatable body 13 and the rotor 11.

Figure 3:
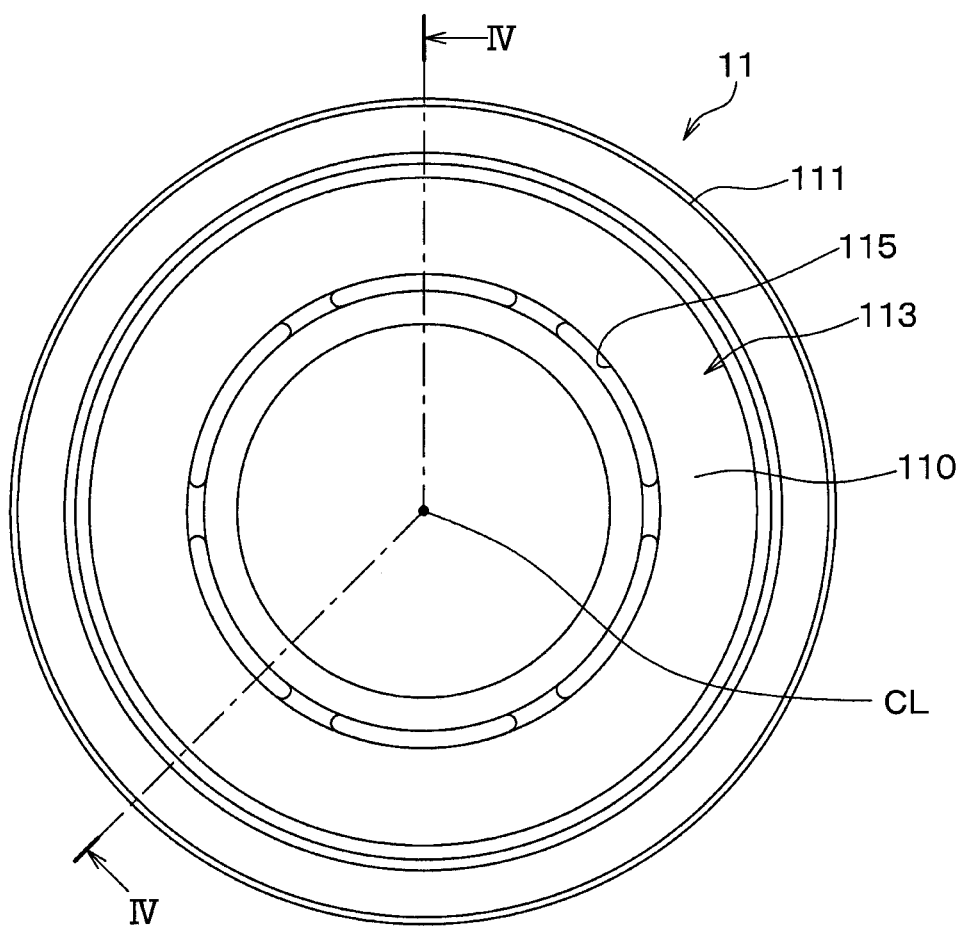
FIG. 3 is a schematic front view of a rotor of the first embodiment.
Figure 4:
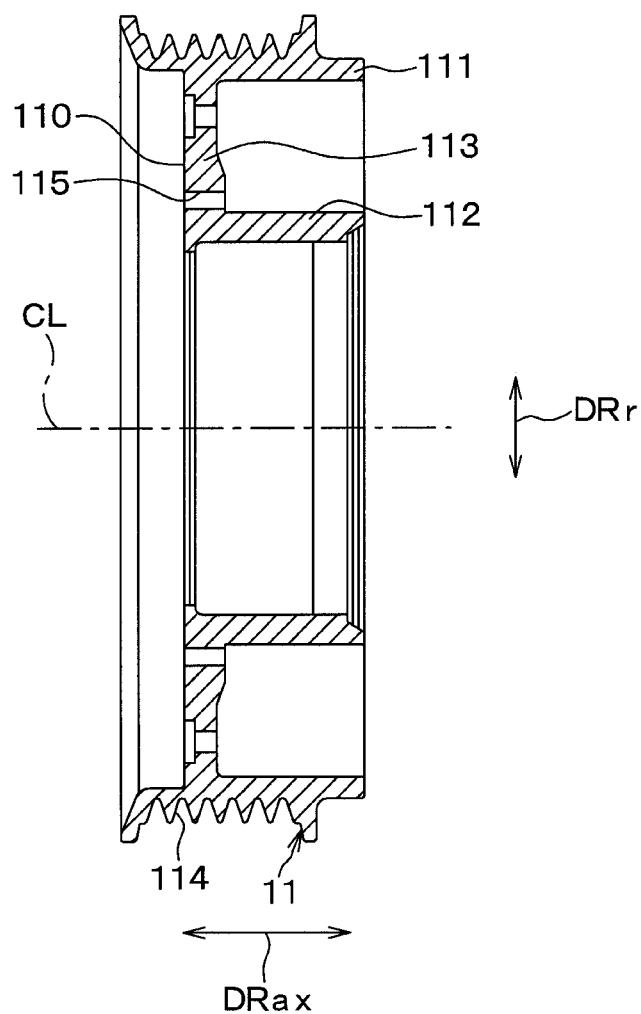
FIG. 4 is a cross-sectional view taken along line IV-IV in FIG. 3.

The rotor 11 serves as a driving-side rotatable body that is rotated by the rotational drive force outputted from the engine 6. As shown in FIGS. 3 and 4, the rotor 11 of the present embodiment includes an outer cylindrical tubular portion 111, an inner cylindrical tubular portion 112 and an end surface portion 113.

The outer cylindrical tubular portion 111 is shaped into a cylindrical tubular form and is coaxial with the shaft 20. The inner cylindrical tubular portion 112 is shaped into a cylindrical tubular form and is placed on a radially inner side of the outer cylindrical tubular portion 111 while the inner cylindrical tubular portion 112 is coaxial with the shaft 20.

The end surface portion 113 is a connecting portion that connects between one end of the outer cylindrical tubular portion 111 and one end of the inner cylindrical tubular portion 112, which are located on one end side in the axial direction Drax. The end surface portion 113 is shaped into a circular disk form. Specifically, the end surface portion 113 extends in the radial direction DRr of the shaft 20 and has a through hole that has a circular cross section and extends through a center portion of the end surface portion 113.

A longitudinal cross section of the rotor 11 of the present embodiment taken along the axial direction Drax of the shaft 20 is shaped into a C-shape form. An annular space is formed between the outer cylindrical tubular portion 111 and the inner cylindrical tubular portion 112 while the end surface portion 113 forms a bottom surface portion of the annular space.

The space, which is formed between the outer cylindrical tubular portion 111 and the inner cylindrical tubular portion 112, is coaxial with the shaft 20. As shown in FIG. 2, the electromagnet 12 is placed in this space that is formed between the outer cylindrical tubular portion 111 and the inner cylindrical tubular portion 112.

The electromagnet 12 includes: a stator 121; and a coil 122 that is placed at an inside of the stator 121. The stator 121 is shaped into a ring form and is made of a ferromagnetic material (e.g., iron). The coil 122 is fixed to the stator 121 in a state where the coil 122 is resin molded with a dielectric resin material, such as epoxy resin. The electromagnet 12 is energized by a control voltage that is outputted from a control device (not shown).

The rotor 11 of the present embodiment includes the outer cylindrical tubular portion 111, the inner cylindrical tubular portion 112 and the end surface portion 113, which are formed integrally in one piece from a metal ferromagnetic material (e.g., iron steel material). The outer cylindrical tubular portion 111, the inner cylindrical tubular portion 112 and the end surface portion 113 form a portion of a magnetic circuit that is formed through the energization of the electromagnet 12.

As shown in FIGS. 2 and 4, an outer peripheral portion of the outer cylindrical tubular portion 111 includes a V-groove portion 114, in which a plurality of V-grooves is formed. The V-belt 7 is wound around the V-groove portion 114 to transmit the rotational drive force outputted from the engine 6. The V-groove portion 114 may be made of, for example, resin rather than the metal ferromagnetic material.

As shown in FIG. 2, an outer peripheral part of a ball bearing 19 is fixed to an inner peripheral part of the inner cylindrical tubular portion 112. A boss portion 22, which is shaped into a cylindrical tubular form and projects from the housing 21 (serving as an outer shell of the compressor 2) toward the power transmission device 10, is fixed to an inner peripheral part of the ball bearing 19. In this way, the rotor 11 is rotatably coupled to the housing 21 of the compressor 2. The boss portion 22 covers a base portion of the shaft 20, which is exposed to the outside of the housing.

An outside surface of the end surface portion 113, which is placed on the one end side in the axial direction Drax, forms a rotor-side friction surface 110 that contacts an armature 14 of the driven-side rotatable body 13 described later when the rotor 11 is coupled to the armature 14.

As shown in FIG. 4, a plurality of slit holes 115 is formed to shield magnetism at an intermediate portion of the rotor-side friction surface 110, which is placed in the middle of the rotor-side friction surface 110 in the radial direction DRr. Each of the slit holes 115 is shaped into an arcuate form that extends in the circumferential direction of the rotor 11, and the plurality of these slit holes 115 is formed at the rotor-side friction surface 110. A magnetic flux flow in the radial direction DRr is blocked by the slit holes 115 at the rotor-side friction surface 110.

Furthermore, although not depicted in the drawings, a friction member, which increases a friction coefficient, is placed at a portion of the rotor-side friction surface 110. The friction member is made of a non-magnetic material. The friction member may be made of a material formed by mixing alumina into resin and solidifying the same or may be made of a sinter of metal powder such as aluminum powder.

Figure 5:
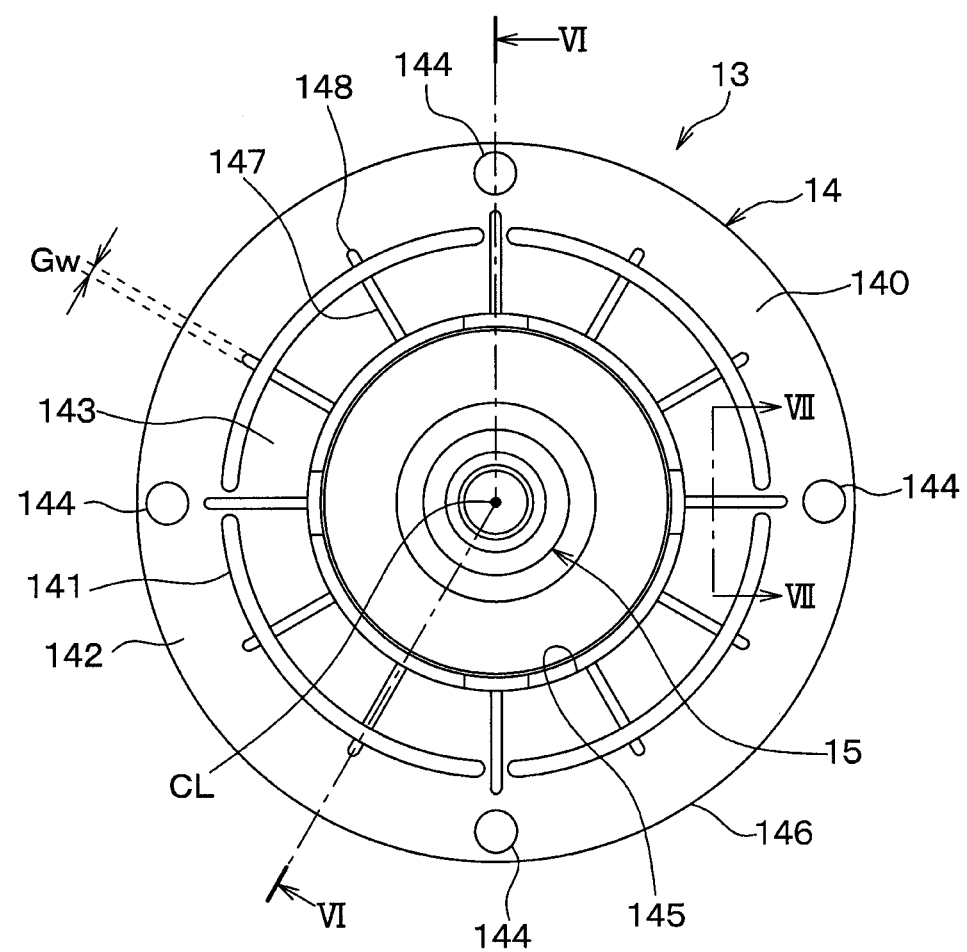
FIG. 5 is a schematic front view of a driven-side rotatable body of the first embodiment.
Figure 6:
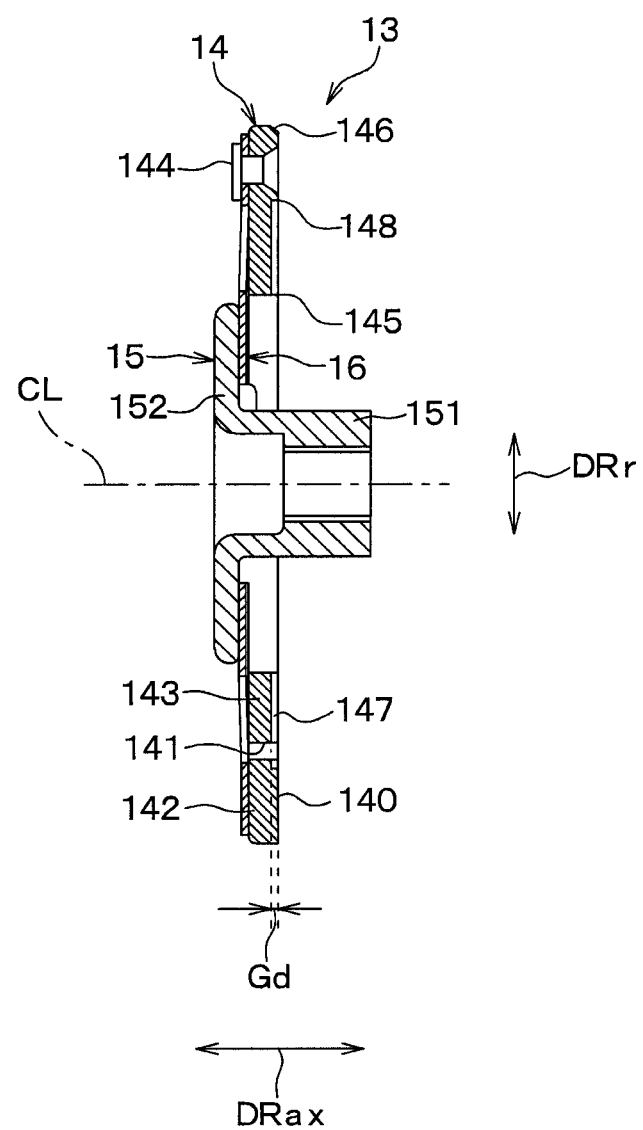
FIG. 6 is a cross-sectional view taken along line VI-VI in FIG. 5.

As shown in FIGS. 5 and 6, the driven-side rotatable body 13 includes the armature 14, the hub 15, and a flat spring 16. The armature 14 is a plate member shaped into a circular ring form. The armature 14 extends in the radial direction DRr and has a through hole penetrating through the armature 14 at a center portion thereof.

The armature 14 is made of the ferromagnetic material (e.g., the iron steel material) that is the same type as the material of the rotor 11. The armature 14 cooperates with the rotor 11 to form a portion of the magnetic circuit that is formed through the energization of the electromagnet 12.

The armature 14 is opposed to the rotor-side friction surface 110 while a predetermined minute gap (e.g., about 0.5 mm) is interposed between the armature 14 and the rotor-side friction surface 110. A planar portion of the armature 14, which is opposed to the rotor-side friction surface 110, forms an armature-side friction surface 140 that contacts the rotor-side friction surface 110 when the rotor 11 and the armature 14 are coupled with each other.

The armature 14 of the present embodiment includes a plurality of slit holes 141 that are formed to shield magnetism at an intermediate portion of the armature 14, which is placed in the middle of the armature 14 in the radial direction DRr. Each of the slit holes 141 is shaped into an arcuate form that extends in the circumferential direction of the armature 14, and the plurality of these slit holes 141 is formed at the armature 14. A magnetic flux flow in the radial direction DRr is blocked by the slit holes 141 at the armature-side friction surface 140.

The armature 14 is divided into an outer peripheral portion 142, which is located on the radially outer side of the slit holes 141, and an inner peripheral portion 143, which is located on the radially inner side of the slit holes 141. The outer peripheral portion 142 of the armature 14 is joined to an outer peripheral part of the flat spring 16 by fastening members 144, such as rivets.

Here, as shown in FIG. 5, a plurality of grooves 147 is formed at the armature-side friction surface 140 of the present embodiment such that the grooves 147 are arranged about the central axis CL of the shaft 20 and respectively extend in a slit form from the radially inner side toward the radially outer side. The grooves 147 are radiated in such a manner that the grooves 147 are arranged one after the other at equal intervals in the circumferential direction of the armature-side friction surface 140. The number of the grooves 147 formed at the armature-side friction surface 140 of the present embodiment is twelve. However, the number of the grooves 147 is not limited to twelve and may be changed to any other number, such as eight or more or less.

Each of the grooves 147 of the present embodiment extends from a radially inner end portion 145, which is an end portion of the armature-side friction surface 140 on the radially inner side, to a location that is on a radially inner side of a radially outer end portion 146, which is an end portion of the armature-side friction surface 140 on the radially outer side. Specifically, each of the grooves 147 is formed such that a groove outer end part 148, which is an outer end part of the groove 147, is located on the inner side of the radially outer end portion 146 at the armature-side friction surface 140.

Furthermore, each of the grooves 147 of the present embodiment is formed such that the groove outer end part 148 of the groove 147 is closer to the radially outer end portion 146 than to the radially inner end portion 145 along the armature-side friction surface 140. In this way, the groove outer end parts 148 of the grooves 147 of the present embodiment are placed on the outer side of the slit holes 141 in the radial direction DRr.

Each of the grooves 147 of the present embodiment linearly extends in the radial direction DRr of the shaft 20. Alternatively, any one or more or all of the grooves 147 may linearly extend in a direction that crosses the radial direction DRr of the shaft 20 or may be shaped into a curved form.

Figure 7:
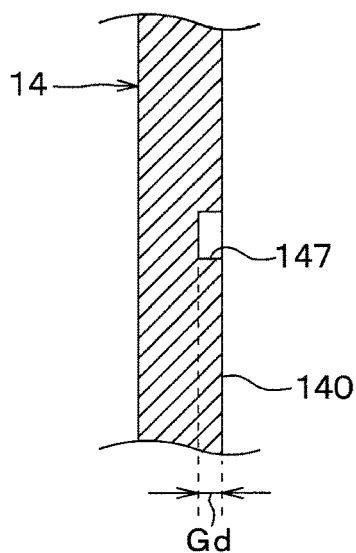
FIG. 7 is a cross-sectional view taken along line VII-VII in FIG. 5.

Furthermore, a groove width Gw and a groove depth Gd of each of the grooves 147 of the present embodiment are set to be substantially constant. Furthermore, as shown in FIG. 7, a cross section of each of the grooves 147 of the present embodiment is shaped into a rectangular form.

The hub 15 serves as a coupling member that couples the armature 14 to the shaft 20 of the compressor 2 through, for example, the flat spring 16. The hub 15 is made of an iron-based metal material. As shown in FIGS. 2 and 6, the hub 15 of the present embodiment includes a tubular portion 151, which is shaped into a cylindrical tubular form, and a connecting flange portion 152.

The tubular portion 151 is coaxial with the shaft 20. The tubular portion 151 has an insertion hole, which is configured to receive the one end portion of the shaft 20. This insertion hole is a through hole that extends through the tubular portion 151 in the axial direction Drax of the shaft 20. The hub 15 and the shaft 20 of the present embodiment are joined together by a fastening technique, such as screws, in a state where the one end portion of the shaft 20, which is placed on the one end side in the axial direction Drax, is inserted into the insertion hole of the tubular portion 151.

The connecting flange portion 152 is formed integrally with the tubular portion 151 in one piece such that the connecting flange portion 152 extends outward in the radial direction DRr from the tubular portion 151 at the one end side of the tubular portion 151 in the axial direction Drax. The connecting flange portion 152 is shaped into a circular disk form that extends in the radial direction DRr. The connecting flange portion 152 is connected to an inner peripheral part of the flat spring 16 described later through fastening members, such as rivets (not shown).

The flat spring 16 is a member that exerts an urging force against the armature 14 in a direction away from the rotor 11. At the power transmission device 10, when the electromagnet 12 is in a deenergized state where the electric current is not supplied to the electromagnet 12, and thereby the electromagnetic attractive force is not generated from the electromagnet 12, a gap is formed between the armature-side friction surface 140 and the rotor-side friction surface 110 by the urging force of the flat spring 16. The flat spring 16 is a circular disk member made of an iron-based metal material.

Although not shown in the drawings, an elastic member, which is in a plate form, is interposed between the flat spring 16 and the armature 14. The flat spring 16 and the armature 14 are joined together by the fastening members 144 in the state where the elastic member is interposed between the flat spring 16 and the armature 14. The elastic member has a function of transmitting a torque between the flat spring 16 and the armature 14 and damps vibrations. The elastic material is made of, for example, a rubber based elastic material.

Next, an operation of the power transmission device 10 of the present embodiment will be described. In the deenergized state of the electromagnet 12, the electromagnetic attractive force of the electromagnet 12 is not generated at the power transmission device 10. Therefore, the armature 14 is urged by the urging force of the flat spring 16 and is thereby held at a position where the armature 14 is spaced from the end surface portion 113 of the rotor 11 by a predetermined distance.

In this way, the rotational drive force of the engine 6 is transmitted only to the rotor 11 through the V-belt 7 but is not transmitted to the armature 14 and the hub 15, so that only the rotor 11 runs idle around the ball bearing 19. Therefore, the compressor 2, which is the drive subject device, is held in a stop state where the compressor 2 is stopped.

In contrast, when the electromagnet 12 is in an energized state where the electric current is supplied to the electromagnet 12, the electromagnetic attractive force of the electromagnet 12 is generated at the power transmission device 10. The armature 14 is attracted to the end surface portion 113 of the rotor 11 against the urging force of the flat spring 16 by the electromagnetic attractive force of the electromagnet 12, so that the armature 14 is coupled to the rotor 11.

At this time, unless there is an abnormality of the compressor 2, such as locking of the shaft 20, the rotation of the rotor 11 is transmitted to the hub 15 through the armature 14 and the flat spring 16, so that the hub 15 is rotated. Then, the rotation of the hub 15 is transmitted to the shaft 20 of the compressor 2, and thereby the compressor 2 is driven. Specifically, the rotational drive force, which is outputted from the engine 6, is transmitted to the compressor 2 through the power transmission device 10, and thereby the compressor 2 is driven.

In contrast, in a case where, for example, the shaft 20 of the compressor 2 is locked, the hub 15, which is joined to the shaft 20, cannot be rotated, so that only the rotor 11 is rotated.

At this time, the frictional heat between the rotor 11 and the armature 14 causes adhesion between the rotor-side friction surface 110 and the armature-side friction surface 140, which are made of the same type of magnetic material.

When a melt, which is generated by the adhesion between the rotor-side friction surface 110 and the armature-side friction surface 140, grows largely, there is a disadvantage, such as easy adhesion of the armature 14 to the rotor 11, which inconveniently disables decoupling of the armature 14 from the rotor 11.

According to a study of the inventors of the present application, it is found that the adhesion between the rotor-side friction surface 110 and the armature-side friction surface 140 tends to occur particularly when the power transmission device 10 is applied to the engine 6 that is provided with the integrated starter generator ISG.

Figure 8:
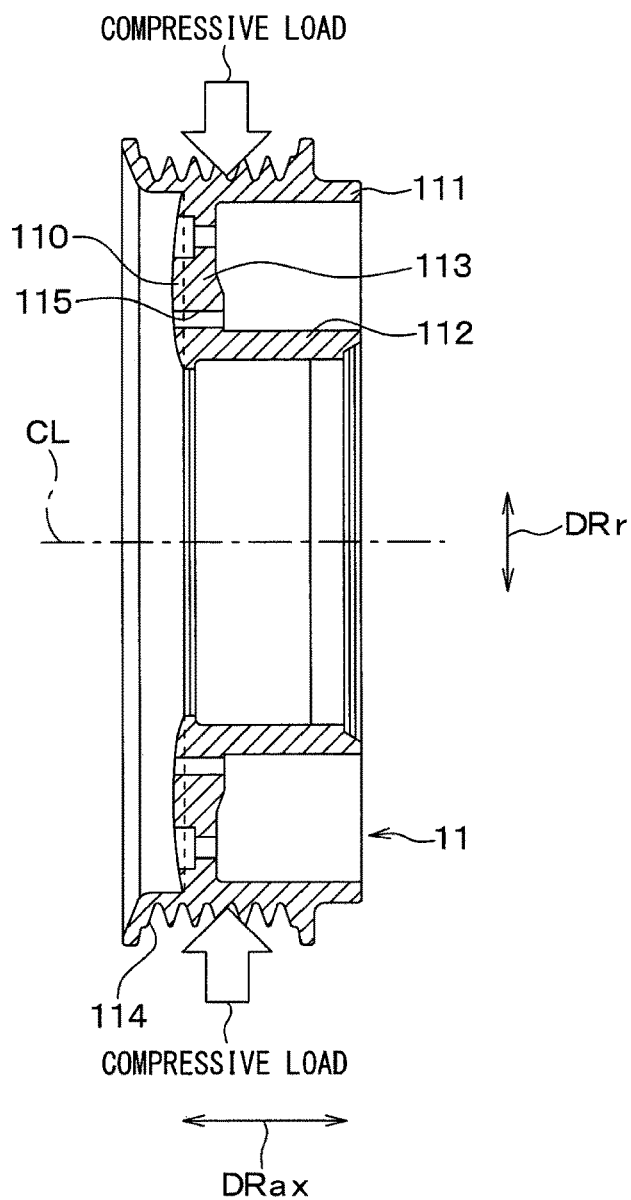
FIG. 8 is a cross-sectional view for describing a state of the rotor at a time of transmitting a rotational drive force of an engine to the rotor.

In view of the above tendency, the inventors of the present application have diligently studied the cause of the large growth of the melt generated by the adhesion between the rotor-side friction surface 110 and the armature-side friction surface 140. As a result of the study, one cause is identified as follows. That is, as shown in FIG. 8, when an excessive compressive load is applied to the rotor 11, a radially inner side of the rotor 11 is bulged toward the armature 14 to cause a local increase in a surface pressure of each friction surface 110, 140. Thereby, the generation of the melt is localized at the radially inner side of the rotor 11.

In the present embodiment, in order to limit the growth of the melt, which is generated by the adhesion between the rotor-side friction surface 110 and the armature-side friction surface 140, the plurality of grooves 147 is formed at the armature-side friction surface 140.

Figure 9:
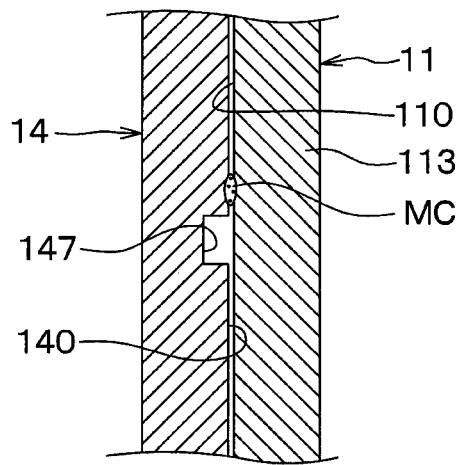
FIG. 9 is a descriptive diagram for describing a state of a melt that is generated by adhesion between a rotor-side friction surface and an armature-side friction surface.
Figure 10:
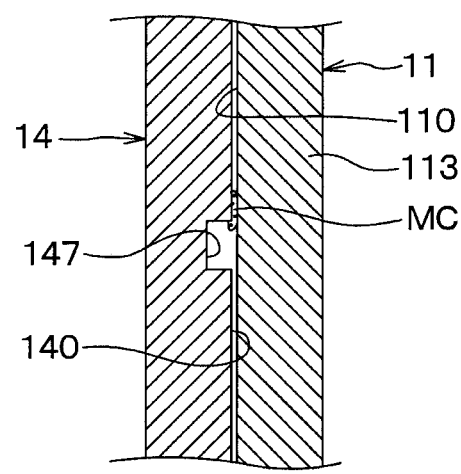
FIG. 10 is another descriptive diagram for describing another state of the melt generated by the adhesion between the rotor-side friction surface and the armature-side friction surface.
Figure 11:
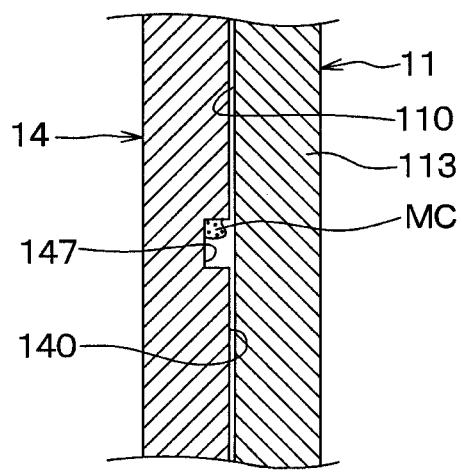
FIG. 11 is a further descriptive diagram for describing another state of the melt generated by the adhesion between the rotor-side friction surface and the armature-side friction surface.

In this way, as shown in FIG. 9, even when the adhesion occurs between the rotor-side friction surface 110 and the armature-side friction surface 140, the melt MC, which is generated by the adhesion, flows into the grooves 147 formed at the armature-side friction surface 140, as shown in FIGS. 10 and 11. Thus, the melt MC, which is generated by the adhesion between the rotor-side friction surface 110 and the armature-side friction surface 140, can be limited from growing large at the contact portion between the rotor-side friction surface 110 and the armature-side friction surface 140.

By the way, it is conceivable that the grooves 147 are extended from the radially inner end portion 145 to the radially outer end portion 146 at the armature-side friction surface 140. However, in such a case, a contact surface area between the rotor-side friction surface 110 and the armature-side friction surface 140 is reduced. This is not preferable because it causes easy occurrence of slippage between the rotor-side friction surface 110 and the armature-side friction surface 140.

In contrast, each of the grooves 147 of the present embodiment extends from the radially inner end portion 145 to the location that is on the radially inner side of the radially outer end portion 146 along the armature-side friction surface 140. Specifically, the grooves 147 of the present embodiment are formed at the region, which extends from the radially inner end portion 145 to the location on the radially inner side of the radially outer end portion 146 along the armature-side friction surface 140, while this region is a region where the adhesion likely occurs at the armature-side friction surface 140.

In comparison to the above-discussed configuration where the grooves 147 extend along the entire radial extent from the radially inner end portion 145 to the radially outer end portion 146 at the armature-side friction surface 140, it is possible to ensure a required contact surface area between the rotor-side friction surface 110 and the armature-side friction surface 140 according to the configuration of the present embodiment. The outer region of the armature-side friction surface 140, which is around the radially outer end portion 146, has a relatively high circumferential speed in comparison to the inner region of the armature-side friction surface 140, which is around the radially inner end portion 145. Therefore, the outer region of the armature-side friction surface 140 becomes a region that is difficult to stick to the rotor-side friction surface 110 through the adhesion between the rotor-side friction surface 110 and the armature-side friction surface 140.

As discussed above, the power transmission device 10 of the present embodiment ensures the required contact surface area between the rotor-side friction surface 110 and the armature-side friction surface 140 and limits various disadvantages caused by the adhesion between the rotor-side friction surface 110 and the armature-side friction surface 140.

The power transmission device 10 of the present embodiment has the configuration where the melt MC generated by the adhesion between the rotor-side friction surface 110 and the armature-side friction surface 140 is difficult to grow. Therefore, the power transmission device 10 of the present embodiment is suitable for the engine 6 that is provided with the integrated starter generator ISG to likely cause generation of the adhesion between the rotor-side friction surface 110 and the armature-side friction surface 140.

Furthermore, the groove outer end part 148 of each of the grooves 147 of the present embodiment is closer to the radially outer end portion 146 than to the radially inner end portion 145 along the armature-side friction surface 140. Accordingly, the melt MC, which is generated by the adhesion between the rotor-side friction surface 110 and the armature-side friction surface 140, is likely to enter the grooves 147. Therefore, it is possible to limit the various disadvantages caused by the adhesion between the rotor-side friction surface 110 and the armature-side friction surface 140.

Modifications of First Embodiment

In the first embodiment described above, the cross section of each of the grooves 147 is shaped into the rectangular form. However, the shape of the cross section of each of the grooves 147 should not be limited to this shape. For instance, the cross section of each of the grooves 147 may have a shape discussed in the following first and second modifications.

(First Modification)

Figure 12:
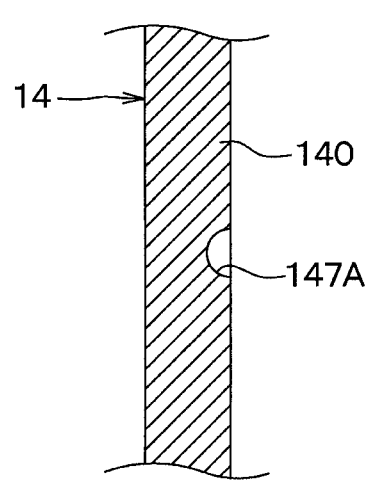
FIG. 12 is a cross-sectional view showing a characteristic feature of an armature of a first modification of the first embodiment.

As shown in FIG. 12, the armature-side friction surface 140 may have a plurality of grooves 147A, each of which is configured to have a cross section that is shaped into an arcuate form (specifically in a C-shape form). FIG. 12 is a cross-sectional view that corresponds to FIG. 7 of the first embodiment.

(Second Modification)

Figure 13:
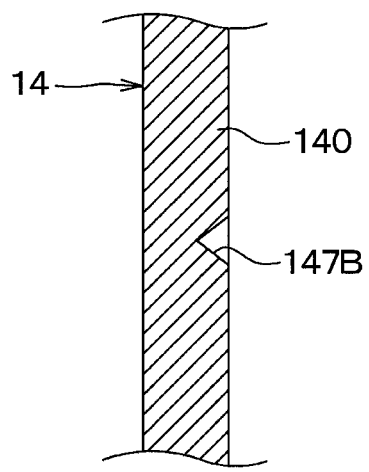
FIG. 13 is a cross-sectional view showing a characteristic feature of an armature of a second modification of the first embodiment.

As shown in FIG. 13, the armature-side friction surface 140 may have a plurality of grooves 147B, each of which is configured to have a cross section that is shaped into a V-shape form. FIG. 13 is a cross-sectional view that corresponds to FIG. 7 of the first embodiment.

Second Embodiment

Next, a second embodiment will be described with reference to FIGS. 14 to 16. The power transmission device 10 of the present embodiment differs from the first embodiment with respect to that the groove depth Gd of each of the grooves 147C of the armature-side friction surface 140 differs from the groove depth Gd of each of the grooves 147 of the first embodiment.

Figure 14:
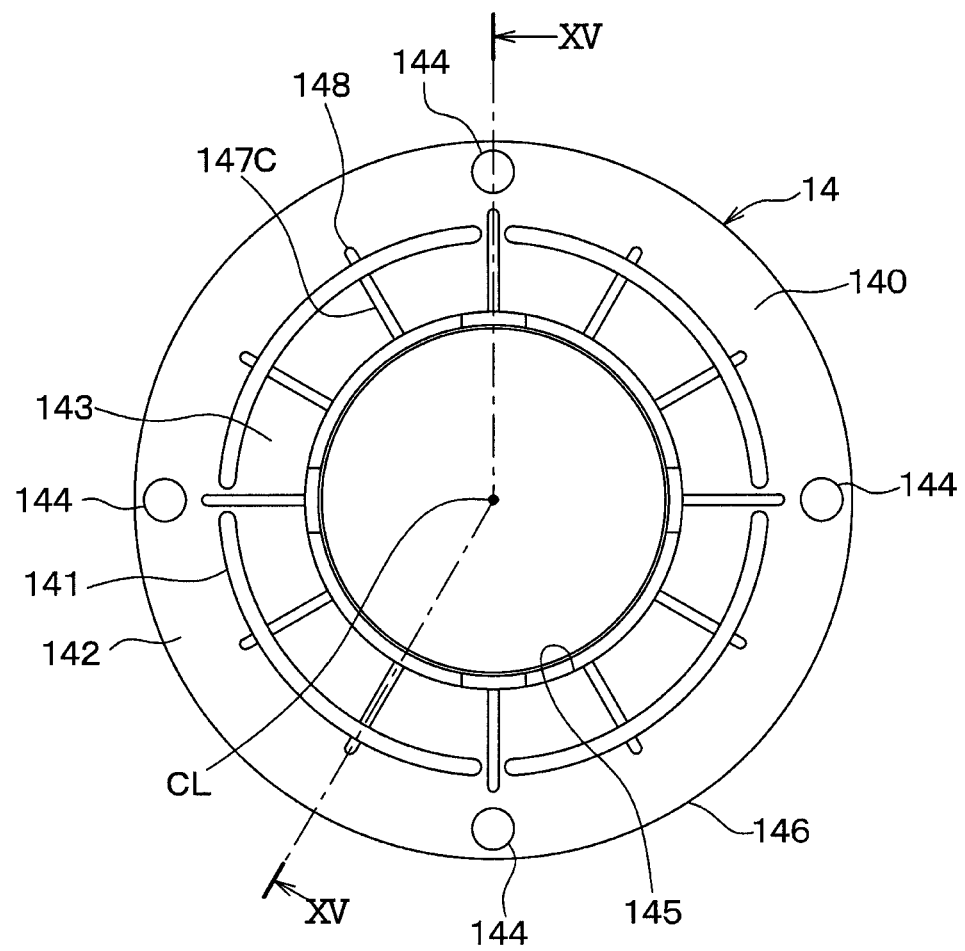
FIG. 14 is a schematic front view of an armature of a second embodiment.
Figure 15:
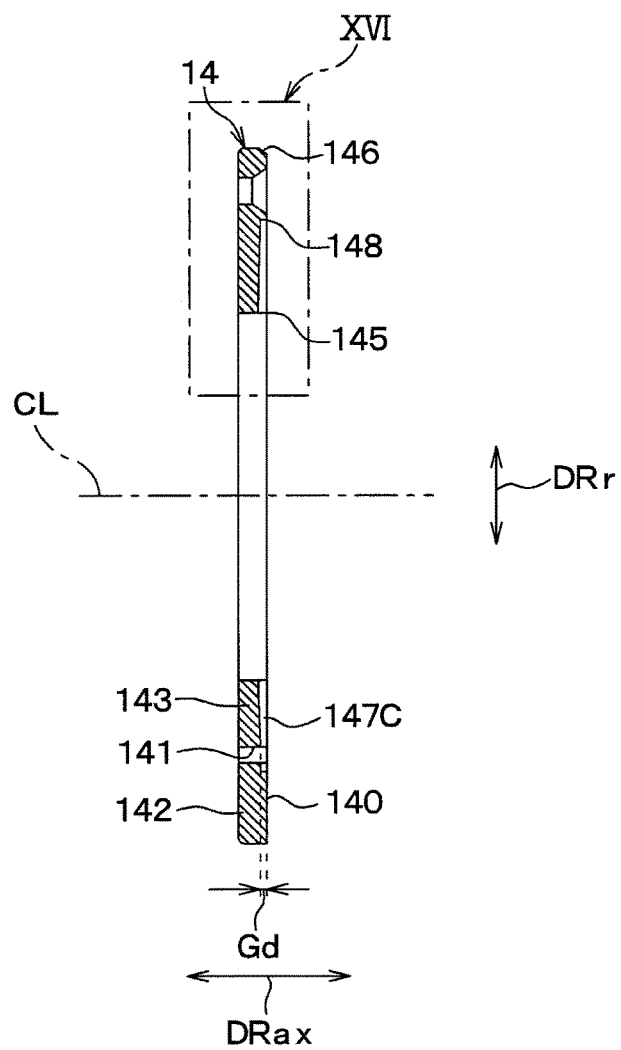
FIG. 15 is a cross-sectional view taken along line XV-XV in FIG. 14.

As shown in FIGS. 14 and 15, the plurality of grooves 147C is formed at the armature-side friction surface 140 of the present embodiment. In the present embodiment, the groove depth Gd at the radially inner side of each of the grooves 147C is increased in view of the finding of that the melt, which is generated by the adhesion, more easily grows at the radially inner side of the armature-side friction surface 140.

Figure 16:
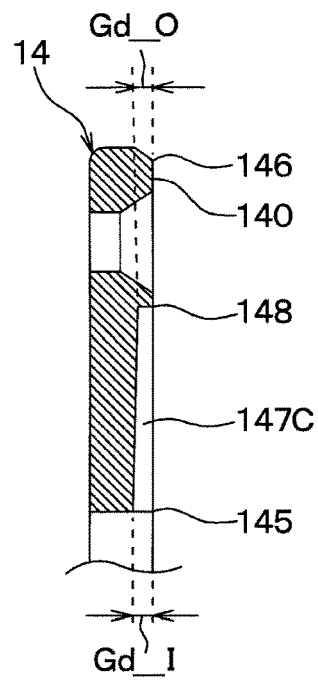
FIG. 16 is an enlarged view of a portion XVI in FIG. 15.

Specifically, as shown in FIG. 16, at each of the grooves 147C of the present embodiment, the groove depth Gd progressively increase from the radially outer side toward the radially inner side at the armature-side friction surface 140. Specifically, a groove depth Gd_I at the radially inner side of each groove 147C, which is closer to the radially inner end portion 145, is set to be larger than a groove depth Gd_O at the radially outer side of the groove 147C, which is closer to the radially outer end portion 146.

The rest of the configuration is the same as that of the first embodiment. The power transmission device 10 of the present embodiment can achieve the advantages, which can be implemented by the common configuration that is common to the first embodiment, like in the first embodiment.

Particularly, in the present embodiment, the groove depth Gd_I at the radially inner side of each of the grooves 147C is set to be larger than the groove depth Gd_O at the radially outer side of the groove 147C. In this way, the groove depth Gd of each of the grooves 147C is increased at the radially inner side of the armature-side friction surface 140 where the adhesion likely occurs, so that the melt, which is generated by the adhesion, can be easily accumulated in the grooves 147C. Therefore, it is possible to limit various disadvantages caused by the adhesion between the rotor-side friction surface 110 and the armature-side friction surface 140.

Furthermore, according to the present embodiment, the groove depth Gd of each groove 147C at the radially outer side of the friction surface, at which the adhesion less likely occurs, is reduced in comparison to the groove depth Gd of the groove 147C at the radially inner side of the friction surface, so that a magnetic resistance of the magnetic circuit formed at the rotor 11 and the armature 14 at the time of energization of the electromagnet 12 can be limited. Specifically, with this configuration, the magnetic performance of the magnetic circuit formed at the rotor 11 and the armature 14 at the time of energization of the electromagnet 12 can be improved.

Third Embodiment

A third embodiment will be described with reference to FIGS. 17 and 18. The power transmission device 10 of the present embodiment differs from the first embodiment with respect to that the groove width Gw of each of the grooves 147D of the armature-side friction surface 140 differs from the groove width Gw of each of the grooves 147 of the first embodiment.

Figure 17:
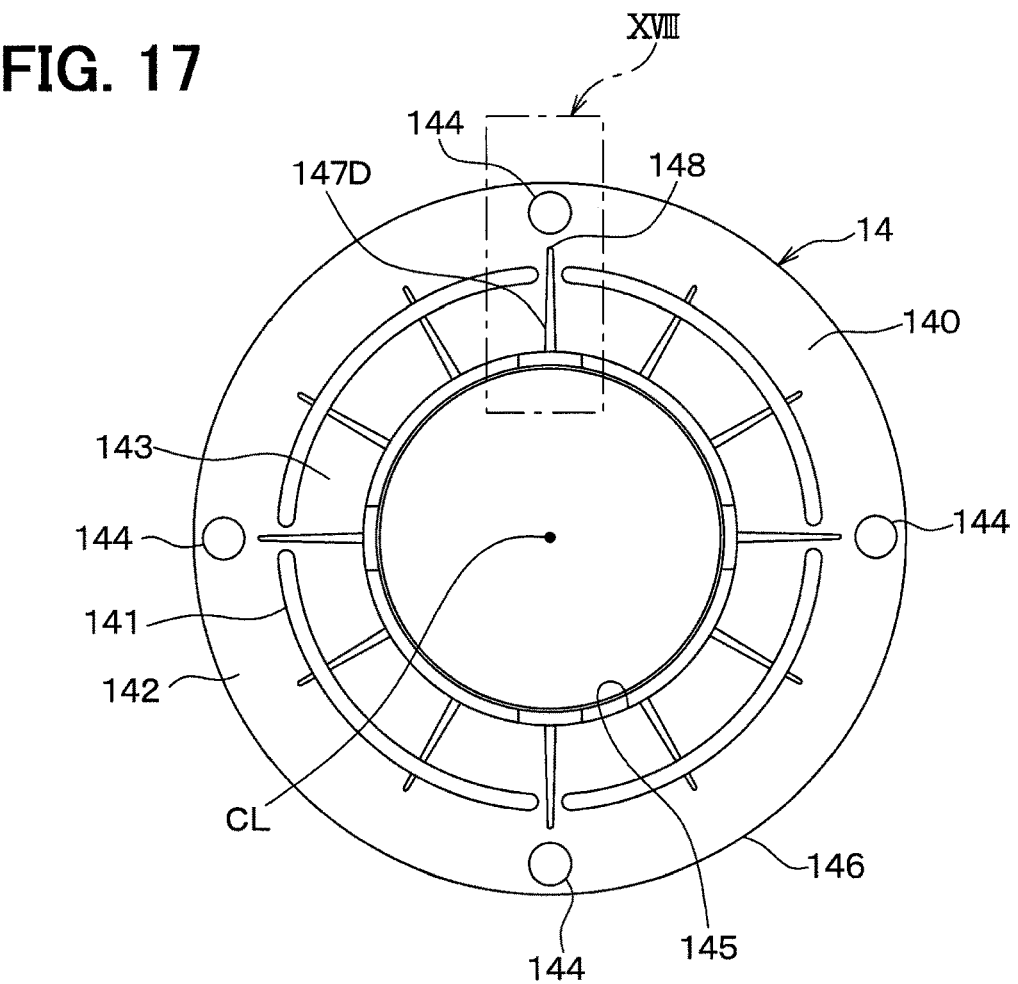
FIG. 17 is a schematic front view of an armature of a third embodiment.
Figure 18:
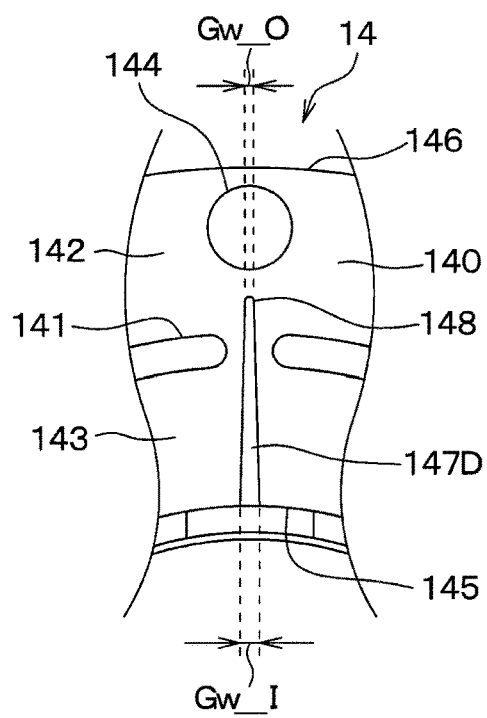
FIG. 18 is an enlarged view of an area XVIII in FIG. 17.

As shown in FIGS. 17 and 18, the plurality of grooves 147D is formed at the armature-side friction surface 140 of the present embodiment. In the present embodiment, the groove width Gw at the radially inner side of each of the grooves 147D is increased in view of the finding of that the melt, which is generated by the adhesion, more easily grows at the radially inner side of the armature-side friction surface 140.

Specifically, at each of the grooves 147D of the present embodiment, the groove width Gw progressively increase from the radially outer side toward the radially inner side at the armature-side friction surface 140. Specifically, a groove width Gw_I at the radially inner side of each groove 147D, which is closer to the radially inner end portion 145, is set to be larger than a groove width Gw_O at the radially outer side of the groove 147D, which is closer to the radially outer end portion 146.

The rest of the configuration is the same as that of the first embodiment. The power transmission device 10 of the present embodiment can achieve the advantages, which can be implemented by the common configuration that is common to the first embodiment, like in the first embodiment.

Particularly, in the present embodiment, the groove width Gw_I at the radially inner side of each of the grooves 147D is set to be larger than the groove width Gw_O at the radially outer side of the groove 147D. In this way, the groove width Gw of each of the grooves 147D is increased at the radially inner side of the armature-side friction surface 140 where the adhesion likely occurs, so that the melt, which is generated by the adhesion, can be easily accumulated in the grooves 147D. Therefore, it is possible to limit the various disadvantages caused by the adhesion between the rotor-side friction surface 110 and the armature-side friction surface 140.

Since the groove width Gw of each of the grooves 147D at the radially outer side of the armature-side friction surface 140, at which the adhesion less likely occurs, is reduced in comparison to the groove width Gw of the groove 147D at the radially inner side of the armature-side friction surface 140, a sufficient contact surface area between the rotor-side friction surface 110 and the armature-side friction surface 140 can be ensured.

Fourth Embodiment

A fourth embodiment will be described with reference to FIGS. 19 and 20. The power transmission device 10 of the present embodiment differs from the first embodiment with respect to that a plurality of grooves 118 is also formed at the rotor-side friction surface 110.

The grooves 118, 147 are formed at the rotor-side friction surface 110 and the armature-side friction surface 140 at the power transmission device 10 of the present embodiment. Since the configuration of the armature-side friction surface 140 is the same as that of the first embodiment, description of the armature-side friction surface 140 is omitted for the sake of simplicity.

Figure 19:
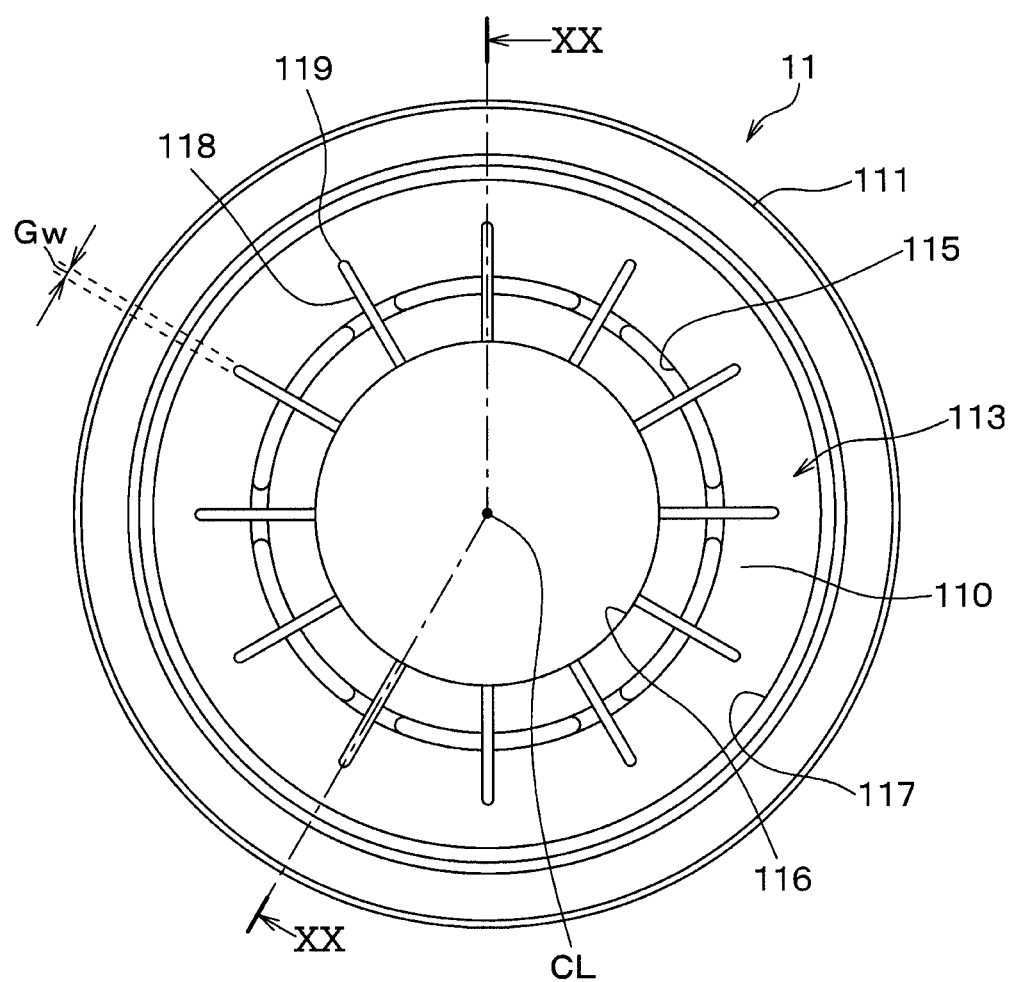
FIG. 19 is a schematic front view of a rotor of a fourth embodiment.
Figure 20:
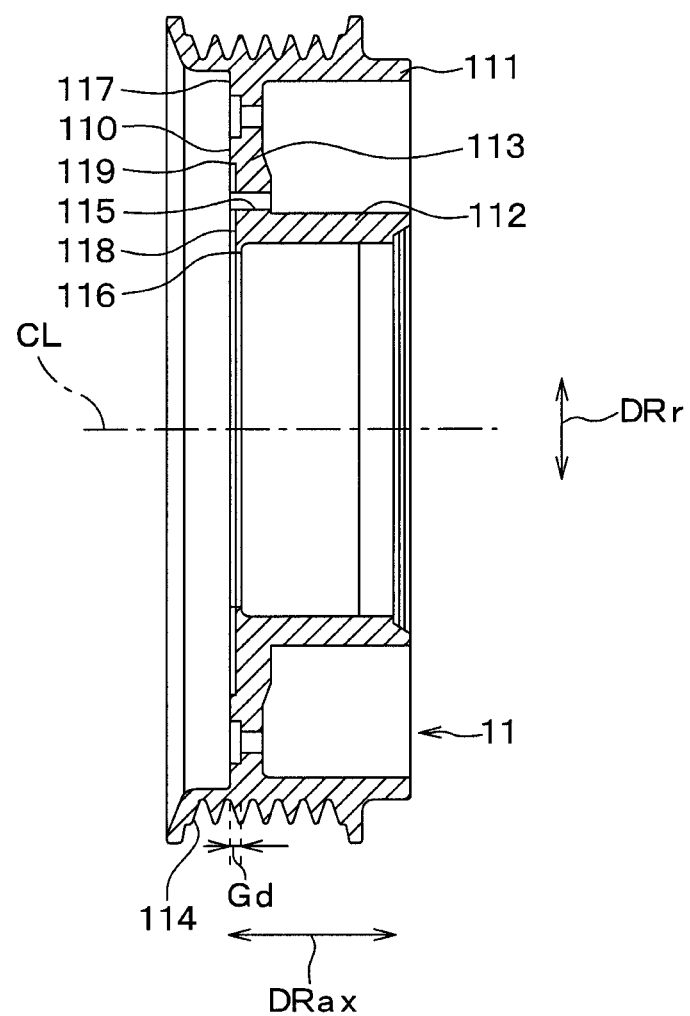
FIG. 20 is a cross-sectional view taken along line XX-XX in FIG. 19.

As shown in FIGS. 19 and 20, the rotor 11 of the present embodiment includes the plurality of grooves 118 that are arranged about the central axis CL of the shaft 20 and respectively extends in a slit form from the radially inner side toward the radially outer side at the rotor-side friction surface 110. The grooves 118 are radiated in such a manner that the grooves 118 are arranged one after the other at equal intervals in the circumferential direction of the rotor-side friction surface 110. The number of the grooves 118 formed at the rotor-side friction surface 110 of the present embodiment is twelve. However, the number of the grooves 118 is not limited to twelve and may be changed to any other number, such as eight or more or less.

Each of the grooves 118 of the present embodiment extends from a radially inner end portion 116, which is an end portion of the rotor-side friction surface 110 on the radially inner side, to a location that is on a radially inner side of a radially outer end portion 117, which is an end portion of the rotor-side friction surface 110 on the radially outer side. Specifically, each of the grooves 118 is formed such that a groove outer end part 119, which is an outer end part of the groove 118, is located on the radially inner side of the radially outer end portion 117 at the rotor-side friction surface 110.

Furthermore, each of the grooves 118 is formed such that the groove outer end part 119 of the groove 118 is closer to the radially outer end portion 117 than to the radially inner end portion 116 at the rotor-side friction surface 110. In this way, the groove outer end parts 119 of the grooves 118 of the present embodiment are placed on the outer side of the slit holes 115 in the radial direction DRr.

Each of the grooves 118 of the present embodiment linearly extends in the radial direction DRr of the shaft 20. Alternatively, any one or more or all of the grooves 118 may linearly extend in a direction that crosses the radial direction DRr of the shaft 20 or may be shaped into a curved form.

Furthermore, a groove width Gw and a groove depth Gd of each of the grooves 118 of the present embodiment are set to be substantially constant. Furthermore, although not depicted in the drawings, a cross section of each of the grooves 118 of the present embodiment is shaped into a rectangular form.

The rest of the configuration is the same as that of the first embodiment. The power transmission device 10 of the present embodiment can achieve the advantages, which can be implemented by the common configuration that is common to the first embodiment, like in the first embodiment.

Particularly, the grooves 118, 147 are formed at the rotor-side friction surface 110 and the armature-side friction surface 140 at the power transmission device 10 of the present embodiment. With this configuration, it is possible to ensure the sufficient space, into which the melt generated by the adhesion between the rotor-side friction surface 110 and the armature-side friction surface 140 enters. Therefore, it is possible to sufficiently limit the growth of the melt formed by the adhesion into a large size. As a result, it is possible to limit the various disadvantages caused by the adhesion between the rotor-side friction surface 110 and the armature-side friction surface 140.

In the present embodiment, there is described the example where the groove configuration of the grooves 118 formed at the rotor-side friction surface 110 is the same as the groove configuration of the grooves 147 formed at the armature-side friction surface 140 described in the first embodiment. However, the present disclosure should not be limited to this configuration. The groove configuration of the grooves 118 formed at the rotor-side friction surface 110 may be different from the groove configuration of the grooves 147 formed at the armature-side friction surface 140.

Other Embodiments

The representative embodiments of the present disclosure have been described. However, the present disclosure should not be limited to the above-described embodiments, and the above-described embodiments may be modified into, for example, the following forms.

As described in the respective embodiments, it is preferred that each of the grooves 118, 147 is formed such that the groove outer end part 119, 148 of the groove 118, 147 is closer to the radially outer end portion 117, 146 than to the radially inner end portion 116, 145 at the friction surface. Alternatively, one or more of the grooves 118, 147 may be formed such that the groove outer end part 119, 148 of the groove 118, 147 is closer to the radially inner end portion 116, 145 than to the radially outer end portion 117, 146 at the friction surface.

In each of the above embodiments, there is described the structure, in which the grooves 147 are formed at the armature-side friction surface 140, or the structure, in which the grooves 147 are formed at both of the rotor-side friction surface 110 and the armature-side friction surface 140. However, the present disclosure should not be limited these structures. For instance, the power transmission device 10 may be configured such that the grooves 118 are formed only at the rotor-side friction surface 110.

In each of the above embodiments, there is described the structure, in which the armature 14 and the hub 15 are coupled together through the flat spring 16. However, the present disclosure should not be limited to this structure. The power transmission device 10 may be configured such that the armature 14 and the hub 15 are coupled together through, for example, an elastic member, such as rubber.

In each of the above embodiments, there is described the example, in which the power transmission device 10 of the present disclosure is applied to the engine 6 provided with the integrated starter generator ISG. However, the present disclosure should not be limited to this configuration. The power transmission device 10 of the present disclosure may be applied to the engine 6 that is not provided with the integrated starter generator ISG.

In each of the above embodiments, there is described the example, in which the power transmission device 10 of the present disclosure is applied to enable and disable transmission of the rotational drive force from the engine 6 to the compressor 2. However, the present disclosure should not be limited to this configuration. The power transmission device 10 of the present disclosure may be applied to, for example, a device that enables and disables transmission of a drive force between a drive source, such as the engine 6 or an electric motor, and an electric generator, which is driven by a rotational drive force.

It is needless to say that the constituent elements in the above-described respective embodiments are not necessarily essential unless it is clearly stated that the element(s) is essential or the element(s) is obviously essential in principle.

In the embodiments described above, when a specific numerical value(s) such as a number, a numerical value, an amount or a range, of any of the constituent elements of the respective embodiments is mentioned, the present disclosure should not be limited to the specific numerical value(s) unless it is clearly stated that the specific numerical value(s) is essential, or the specific numerical value(s) is obviously essential in principle.

In the above respective embodiments, when a shape, a positional relationship or the like of the respective constituent elements is mentioned, it should not be limited to the shape, the positional relationship or the like of the respective constituent elements unless it is clearly stated that the shape, the positional relationship or the like of the respective constituent element(s) is essential, or the shape, the positional relationship or the like of the respective constituent element(s) is obviously essential in principle.

CONCLUSION

According to a first aspect indicated at one or more or all of the above embodiments, the power transmission device is configured such that at least one of the rotor-side friction surface and the armature-side friction surface has the plurality of grooves, each of which extends from the radially inner end portion of the at least one of the rotor-side friction surface and the armature-side friction surface to the location that is on the radially inner side of the radially outer end portion of the at least one of the rotor-side friction surface and the armature-side friction surface.

According to a second aspect, the power transmission device is configured such that the groove outer end part of each of the plurality of grooves, which is located at the radially outer side of the groove, is closer to the radially outer end portion than to the radially inner end portion. According to this configuration, the melt generated by the adhesion can easily enter the grooves. As a result, it is possible to limit various disadvantages caused by the adhesion between the rotor-side friction surface and the armature-side friction surface.

According to a third aspect, the power transmission device is configured such that the groove depth at the radially inner side of each of the grooves is set to be larger than the groove depth at the radially outer side of the groove. In this way, the groove depth of each of the grooves is increased at the radially inner side of the friction surface where the adhesion likely occurs, so that the melt generated by the adhesion can be easily accumulated in the grooves. As a result, it is possible to limit various disadvantages caused by the adhesion between the rotor-side friction surface and the armature-side friction surface. Furthermore, the groove depth of each groove at the radially outer side of the friction surface, at which the adhesion less likely occurs, is reduced in comparison to the groove depth of the groove at the radially inner side of the friction surface, so that the magnetic resistance of the magnetic circuit formed at the rotor and the armature at the time of energization of the electromagnet can be limited. Specifically, with this configuration, the magnetic performance of the magnetic circuit formed at the rotor and the armature at the time of energization of the electromagnet can be improved.

According to a fourth aspect, the power transmission device is configured such that the groove width at the radially inner side of each of the grooves is set to be larger than the groove width at the radially outer side of the groove. In this way, the groove width of each of the grooves is increased at the radially inner side of the friction surface where the adhesion likely occurs, so that the melt generated by the adhesion can easily enter the grooves. As a result, it is possible to limit various disadvantages caused by the adhesion between the rotor-side friction surface and the armature-side friction surface. The groove width of each of the grooves at the radially outer side, at which the adhesion less likely occurs, is reduced in comparison to the groove width of the groove at the radially inner side, so that the sufficient contact surface area between the rotor-side friction surface and the armature-side friction surface can be ensured.

According to a fifth aspect, the power transmission device is configured such that the grooves are formed at the rotor-side friction surface and the armature-side friction surface. According to this configuration, it is possible to ensure the sufficient space, into which the melt generated by the adhesion enters. As a result, it is possible to limit growth of the melt generated by the adhesion into a large size. As a result, it is possible to limit various disadvantages caused by the adhesion between the rotor-side friction surface and the armature-side friction surface.

According to a sixth aspect, the power transmission device is configured such that the drive source is provided with the integrated starter generator that is configured to assist the output of the drive source. The power transmission device of the present disclosure has the configuration where the melt generated by the adhesion between the rotor-side friction surface and the armature-side friction surface is difficult to grow. Therefore, the power transmission device of the present disclosure is suitable for the drive source that is provided with the integrated starter generator to likely cause generation of the adhesion between the rotor-side friction surface and the armature-side friction surface.

What is claimed is:

1. A power transmission device for transmitting a rotational drive force outputted from a drive source to a drive subject device, the power transmission device comprising:
   an electromagnet that is configured to generate an electromagnetic attractive force at a time of energizing the electromagnet;
   a rotor that is configured to be rotated by the rotational drive force; and
   an armature that is shaped into a circular ring form and is configured to be coupled with the rotor by the electromagnetic attractive force at the time of energizing the electromagnet and is configured to be decoupled from the rotor at a time of deenergizing the electromagnet, wherein:
   the rotor has a rotor-side friction surface that is configured to contact the armature at the time of energizing the electromagnet;
   the armature has an armature-side friction surface that is configured to contact the rotor-side friction surface at the time of energizing the electromagnet;
   at least one of the rotor-side friction surface and the armature-side friction surface has a plurality of grooves, each of which extends from a radially inner end portion of the at least one of the rotor-side friction surface and the armature-side friction surface to a location that is on a radially inner side of a radially outer end portion of the at least one of the rotor-side friction surface and the armature-side friction surface; and
   a groove depth measured at a radially inner side of each of the plurality of grooves is set to be larger than a groove depth measured at a radially outer side of each of the plurality of grooves.

2. The power transmission device according to claim 1, wherein a groove outer end part of each of the plurality of grooves, which is located at a radially outer side of the groove, is closer to the radially outer end portion than to the radially inner end portion.

3. The power transmission device according to claim 1, wherein a groove width measured at a radially inner side of each of the plurality of grooves is set to be larger than a groove width measured at a radially outer side of each of the plurality of grooves.

4. The power transmission device according to claim 1, wherein each of the rotor-side friction surface and the armature-side friction surface includes the plurality of grooves.

5. The power transmission device according to claim 1, wherein the drive source is provided with an integrated starter generator that is configured to assist an output of the drive source.

* * * * *